United States Patent [19]

Toman

[11] Patent Number: 4,812,523

[45] Date of Patent: Mar. 14, 1989

[54] HIGH SOLIDS COATINGS WITH REACTIVE DILUENT

[75] Inventor: Perry A. Toman, Medina, Ohio

[73] Assignee: The Glidden Company, Cleveland, Ohio

[21] Appl. No.: 147,440

[22] Filed: Jan. 25, 1988

[51] Int. Cl.$^4$ ............................................ C08L 61/00
[52] U.S. Cl. ..................................... 525/162; 524/512; 525/163; 525/166
[58] Field of Search ................. 525/162, 443, 518, 163

[56] References Cited

U.S. PATENT DOCUMENTS 4,520,167 5/1985 Blank et al. .......................... 525/131
4,716,200 12/1987 Berghoff ............................. 525/111

*Primary Examiner*—Theodore E. Pertilla
*Attorney, Agent, or Firm*—Thomas M. Schmitz

[57] ABSTRACT

A high solids, thermosetting coating composition for painting substrates comprises low molecular weight acrylic polymer, low molecular weight polyester polymer, and low molecular weight urethane diluent, where the acrylic and polyester and urethane components each contain hydroxyl functionality and are coreactive with an amine derivative crosslinking resin to render the coating thermosetting.

8 Claims, No Drawings

HIGH SOLIDS COATINGS WITH REACTIVE DILUENT

BACKGROUND OF THE INVENTION

This invention relates to high solids thermosetting protective coatings and particularly to a blend of polyester and acrylic copolymer for use in high solids coatings further containing a hydroxyl functional urethane diluent. High solids coatings are non-aqueous coatings containing minor amounts of organic solvents and are particularly useful as coatings on appliances, aluminum extrusions, general metal surfaces, and wood substrates.

Acrylic polymers are known to generally provide useful coatings exhibiting good film properties. These polymers can contain reactive functional groups which are coreactive with other polymers or resins to provide thermosetting binder systems. Such acrylic binders can be produced by solution or bulk polymerization of ethylenically unsaturated monomers including acrylic monomers. Solvent can be added in minor amounts to render the acrylic polymer fluent. Various acrylic polymers have been suggested to provide high solids polymeric compositions such as disclosed in U.S. Pat. No. 4,374,164, or combined other polymers such as suggested in U.S. Pat. No. 4,397,989 or U.S. Pat. No. 4,369,283. Commonly assigned U.S. Pat. No. 4,716,200 issued Dec. 29, 1987 discloses low molecular weight acrylic copolymers combined with low molecular weight polyester polymer to provide high solids coatings whereas U.S. Pat. No. 4,397,989 discloses a high molecular weight acrylic copolymer in conjunction with a polyester polymer to provide acrylic high solids coatings.

Reactive diluents are described in U.S. Pat. No. 4,022,726 and U.S. Pat. No. 4,417,022, which described hydroxy functional urethane containing diluents. These diluents are characterized as having one primary or secondary hydroxyl group and have a retained solids value of greater than 80 percent by weight. The reaction of mono- and di-amines with monocyclocarbonates has been described by M. F. El-Giamal and R. C. Shultz, Makromol. Chem., 177(8), 2259 (1976), which discloses hydroxyl urethanes being furter reacted with isocyanates or acid functional materials to form alternating polyester-urethanes or copolyurethanes.

It now has been found that polyester acrylic polymeric blends useful in high solids coatings can be formulated with urethane containing diluents having hydroxyl functionality and provide good retention of the diluent in the coating film. These diluents have the added advantage that they have a large effect on the reduction of viscosity of a fluid coating and do not have an adverse effect on the final coating appearance or coating physical properties. These and other advantages of this invention will become more apparent by referring to the detailed description of the invention along with the illustrative examples.

SUMMARY OF THE INVENTION

Briefly, the invention comprises a coating composition based on an acrylic copolymer and a polyester polymer as the binder combined with a hydroxyl functional urethane diluent. On a weight basis, the polymeric coating can contain between 5% and 60% hydroxyl functional urethane diluent additive based on the binder system of acrylic copolymer, polyester polymer, and hydroxyl funtional urethane diluent.

DETAILED DESCRIPTION OF THE INVENTION

This composition comprises a high solids coating comprising a reactive acrylic copolymer, a reactive polyester polymer, and a hydroxyl functional diluent.

Referring first to the acrylic binder, the acrylic polymer comprises an organic solvent solution or bulk copolymerized ethylenically unsaturated monomers, including acrylic monomers, to produce a non-aqueous acrylic polymer containing reactive primary hydroxyl groups and having a number average molecular weight between 500 and 2500, and preferably between 900 and 1200. Number average molecular weights are measured by gel permeation chromatography (GPC) according to ASTM methods such as D3016-72; D3536-76; D3593-80; or D3016-78. The acrylic polymers are liquid at room temperature and generally have a Tg between $-20°$ C. and $+20°$ C. as calculated by the Fox equation based on the ratio of specific monomers. The hydroxyl number of the acrylic polymer is broadly between 50 and 200 and preferably between 100 and 150. The acrylic polymer can be produced by bulk polymerization of ethylenically unsaturated monomers including acrylic monomers, activated by peroxide or azo or other free radical inhibitor at polymerization temperatures typically between 70° C. to 170° C. and preferably between 120° C. to 150° C. Typically 0.5 to 2% peroxide initiator is utilized based on the weight of the monomers. Typical polymerization initiators can include for instance benzoyl peroxide, t-butyl hydroperoxide, tertiary butyl perbenzoate, cumene peroxide and similar peroxide polymerization catalysts which are preferred. Other initiators include azo initiators such as azo bis isobutyronitrile and persulfate or ammonium persulfates.

Copolymerizable ethylenically unsaturated monomers useful in producing the acrylic copolymer are monomers containing carbon-to-carbon unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexene as well as conjugated dienes such as 1,3 butadiene, methyl-2-butadiene, 1,3-piperylene, 2,3 dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Acrylic acids include acrylic and methacrylic acid, ethacrylic acid, alpha-chloracrylic acid, alpha-cyanoacrylic acid, crotonic acid, beta-acryloxy propionic acid, and beta-stryl acrylic acid. Olefinic unsaturated acids include fumaric acid, maleic acid or anhydride, haconic acid, citraconic acid, mesaconic acid, muconic acid, glutaconic acid, aconitic acid, hydrosorbic acid, sorbic acid, alpha-chlorosorbic acid, cinnamic acid, and hydromuconic acid as well as esters of such acids. Ethylenically unsaturated carboxylic acid amides and derivatives can be added in very minor amounts up to 5% and can include acrylamides or methacrylamides such as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or isobutyl alkyl groups.

Hydroxyl containing monomers are hydroxy containing ethylenically unsaturated monomers including hydroxyl alkyl acrylates such as 2-hydroxy ethyl acrylate and methacrylate, 2-hydroxypropyl acrylate and methacrylate, and similar hydroxy alkyl acrylates. On a weight basis, the monomers comprise at least 5% and preferably between 5% and 95% acrylic monomer, between 5% and 30% hydroxyl monomer, and the remainder being acrylic and/or other ethylenic monomers to provide an acrylic copolymer having an Acid No. between 1 and 30 and a Hydroxyl No. between 50 and 200.

Typical solvents useful in preparing the acrylic copolymer, if desired, can include for instance, toluene, ethyl acetate, acetone, methylisobutyl ketone, methyl n-amyl ketone, methylisoamyl ketone, ethylamyl ketone, amyl acetate, methylethyl ketone, ethyl alcohol, mineral spirits, ethylene glycol monoethyl ether acetate, and other aliphatic, cycloaliphatic and aromatic hydrocarbon, esters, ethers, ketones and alcohols. After the polymerization is completed, solvents can be stripped off to increase the polymer solids content of the resulting polymer solution.

Preferred acrylic high solids compositions comprise an acrylic copolymer in conjunction with a linear polyester polymer to form the high solids acrylic binder component of the coating.

Referring next to the polyester component of the polymeric mixture, the polyester polymer is a low molecular weight linear polymer having a number average molecular weight measured by GPC between about 250 and 2,000 and preferably between 400 and 1,000 based on number average. Linear aliphatic, non-ether type glycols are esterified with considerably lesser molar amounts of aromatic dicarboxylic acid and a linear saturated dicarboxylic acid having between 2 and 10 linear carbon atoms such as adipic, azelaic, succinic, glutaric, pimelic, suberic or sebacic acid to produce low molecular weight polyesters. Preferred and commercially available linear saturated dicarboxylic acids are adipic or azelaic acid. Aromatic dicarboxylic acids (anhydrides) include phthalic, isophthalic, terephthalic, and tetrahydrophthalic. Isophthalic is preferred for superior films exhibiting detergent, salt spray and corrosion resistance. Suitable glycols include non-ether linear aliphatic glycols having 2 to 8 carbon atoms such as 1,3 or 1,4 butylene glycol, 1,6 hexane diol, neopentyl glycol, propylene glycol and similar linear glycols. Preferred glycol is neopentyl glycol. The molar excess of the glycol over the lesser molar amounts of aromatic and linear saturated dicarboxylic acid is between about 10% and 80% and preferably between about 20% and 60%. On a molar basis, the preferred low molecular weight polyester polymer comprises between 0.1 and 0.5 moles of aromatic dicarboxylic acid and 0.5 and 0.1 moles of linear saturated dicarboxylic acid per 1 mole of glycol. Hence, the polyester contains considerable excess unreacted hydroxyl groups to provide a hydroxy polyester having a hydroxyl number between 115 and 285 and preferably between 175 and 240. The polyester contains free carboxyl groups imparting an acid number that is preferably below 15 and typically between 5 and 10 mg KOH per gram of polyester. Glycol can be esterified with minor amounts of up to about 5% by weight of unsaturated dicarboxylic acids (anhydrides) including maleic, fumaric or itaconic acids; or monocarboxylic acids such as acetic, propyl-, and higher chain aliphatic acids up to about 8 carbon atoms. The polyester component can be produced by solvent or bulk polymerization although bulk polymerization is preferred. The raw materials can be charged in bulk and esterification polymerized at temperatures typically between 190° C. to 240° C. although moderately higher or lower temperatures can be utilized satisfactorily. An esterification catalyst can be used, typically at less than 1% levels based on charge, such as an organo tin compound.

Referring next to the hydroxyl urethane diluent, the urethane is a reactive, hydroxyl functional, very low molecular weight diluent preferably formed by reacting a primary or secondary amine with a cyclic carbonate. Amino functional materials can optionally contain a hydroxyl group. Examples of suitable diamines are Isophorone diamine, piperazine, hexane diamine, N,N'-dimethyl 1,6 hexanediamine, dodecanediamine, 1,4-diaminocyclohexane or 2-methyl pentamethylene diamine. Suitable hydroxyl amines are ethanolamine, diethanolamine, neopentanolamine and the like. Preferred cyclic carbonates are ethylene carbonate and propylene carbonate. The reaction of mono- and di-amine with monocyclocarbonates has been described by M. F. El-Giamal and R. C. Shultz, Makromol. Chem., 177 (8), 2259 (1976), and the same is incorporated herein by reference. The resulting hydroxyl functional urethane diluent can comprise on an equivalent basis one equivalent of amine coreacted with between 0.8 and 1.5 equivalents of cyclic carbonate where the idealized structure comprises two cyclic carbonate molecules coreacted with a diamine molecule. The hydroxyl number can be between 100 and 750 and the number average molecular weight as measured by GPC of the hydroxyl urethane diluent can be between 150 and 1000. The hydroxyl urethane diluent can comprise between 5 and 60 by weight of the high solids polymeric mixture of polyester, acrylic and crosslinking amine resins.

The foregoing hydroxyl functional, urethane diluent, acrylic, and polyester polymers can be combined with a coreative amine derivative crosslinking resin such as aminoplast including glycolurils. Examples of useful aminoplast resins are the reaction products of ureas and melamines with aldehydes further etherified with an alcohol. Examples of aminoplast resin components are urea, ethylene urea, thiourea, melamine, benzoguanamine. Aldehydes useful in this invention are formaldehyde, acetaldehyde and propionaldehyde, although formaldehyde is clearly preferred. The aminoplast resins can be used in the alkylol form but, most preferably, are utilized in the ether form by etherifying with a monohydric alcohol containing from 1 to about 8 carbon atoms. In a melamine molecule, for instance, up to 3 of the 6 active hydrogens on the amine group can be advantageously substituted with an alkanol group having 1–8 carbon atoms. Higher levels such as 6 substitution can be used in Cymel 300 (1,3,5-triazine-2,4,6-triamine polymer) which contains 6 substituted methylol groups. The alkanol groups stabilize the melamine or other amine derivative under ordinary temperature, but enable reaction at higher temperatures. Preferred substitutions are between 2 and 4 substitutions to avoid popping or solvent entrapment with a fast curing film. Examples of aminoplast resins are methylol urea, dimethoxymethylol urea, butylated polymeric urea-formaldehyde resins, hexamethoxymethyl melamine, methylated polymeric melamine formaldehyde resin and butylated polymeric melamine formaldehyde resin. Glycoluril derivatives are disclosed in U.S. Pat. No. 4,064,191 and are also known as acetylendiureas. Glycolurils are derived by reacting two moles of urea with one mole of glyoxal to provide a complex ring structure where substitute constituents can be a hydrogen, or a lower alkyl radical, or can be methylolated partially or fully by reacting with 1 to 4 moles of formaldehyde to provide a methylol glycoluril. The preparation of various glycolurils is illustrated in U.S. Pat. No. 4,064,191 such as tetramethylol glycoluril, tetrabutoxymethyl glycoluril, partially methyolated glycoluril, tetramethoxymethyl glycoluril, and dimethoxydiethoxy glycoluril. Useful glycoluril derivatives include for example, mono- and dimethylether of dimethylol glycoluril, the trimethylether of tetramethylol glycoluril, the tetramethylether of tetramethylol glycoluril, tetrakisethoxymethyl glycoluril, tetrakispropoxymethyl glycoluril, tetrakisbutoxymethyl glycoluril, tetrakisamyloxymethyl glycoluril, tetrakishexoxymethyl glycoluril and the like. Glycoluril derivatives can further include dimethylol dihydroxy ethylene urea which is disclosed in U.S. Pat. No. 4,540,735 and incorporated herein by reference.

On a polymer solids weight basis, the blend of polymers comprises broadly between 5% and 50% acrylic copolymer, between 10% and 60% polyester polymer, between 5% and 60% hydroxyl urethane diluent and between 20% and 40% amine derivative cross-linking resin. Preferred polymeric blend compositions comprise 15% to 25% acrylic polymer, 20% to 50% polyester polymer, between 10% and 30% hydroxyl urethane diluent and 25% and 35% cross-linker such as aminoplast resin.

In use, the acrylic copolymer containing amounts of primary hydroxyl groups can be used as a grind vehicle for preparing a pigmented vehicle base. Suitable pigments include titanium dioxides, carbon black, cadmiums, yellow, brown, and tan iron oxides as well as other oxide pigments and further include inert fillers such as talcs, clays, and fumed silicas. The acrylic polymer physically wets the titanium dioxide pigment surface for instance and further maintains the pigment in stable dispersion. Up to about six weight parts and typically between about 3.5 and 4 weight parts of pigment can be combined with one weight part of acrylic polymer depending on the adsorbtion properties of the pigment particles. Pigmented coatings typically comprise a pigment to binder ratio of about 1 to 1 for white or light colored paints. Black or dark colored paints may have a pigment to binder ratios as low as 0.5 to 1.0. The preformed acrylic polymer pigment grind can be combined with the polyester polymer, the hydroxyl urethane additive, and the amine derivative cross-linking resin.

The merits of this invention are further illustrated by the following examples wherein parts indicated are by weight and temperatures are in centigrade unless otherwise indicated.

EXAMPLE 1

Synthesis of a hydroxy functional urethane reactive diluent: 320 grams of Kemamine DP-3680 is charged to a 1 liter flask equipped with a stirrer, thermometer, reflux condenser and an addition funnel. 112.3 grams of propylene carbonate is then added over a 50 minute time period. Following this the reaction mixture is heated to 85 C., and held for 3 hours. The final product has an ASTM non-volatile content of 97.9, a base number of 8.5 and a Gardner-Holt viscosity of Z6+¾. Optionally, the free amine can be removed via neutralization with aqueous lactic acid followed by passing the material through an ion exchange column filled with Amberlite 200CH packing material. Kemamine DP-3680 is a diprimary amine with an approximate chain length of 42 carbons and is a product of Witco Chemical Corporation.

EXAMPLE 2

200.4 grams of N-methylethanol amine is charged to a 1 liter flask fitted as above. 299.6 grams of propylene carbonate is added over a 50 minute time period. The reaction mixture is heated to 100 C. and held for 4 hours. The final product has an ASTM non-volatile content by weight of 71.6 and a base number of 5.6.

EXAMPLE 3

213 grams of ethanol amine is added to a 1 liter flask as above. 391.5 grams of propylene carbonate is added over a 45 minute time period. The reaction mixture is then heated to 100 C. and held for 2 hours. The final product has an ASTM non volatile content of 89.7, a base number of 1.9 and a Gardner-Holt viscosity of X.

EXAMPLE 4

176.7 grams of isophorone diamine is added to a 1 liter flask. 233.4 grams of propylene carbonate is added over a 15 minute period. The flask is heated slowly to 120 C. and held for 2 hours. 100 grams of methyl amyl ketone is added and the mixture cooled. The final product has a ASTM non-volatile by weight of 72.7, a base number of 15.9 and a Gardner-Holt viscosity of Z5+⅔.

In an analogous manner to the previous examples 287 grams of neopentanolamine is reacted with 313 grams of propylene carbonate. The resulting product has a base number of 4.7 and a Gardner-Holt viscosity of Z5+¼.

EXAMPLE 6

As a further example, 73.2 grams of anhydrous piperazine is reacted with 191 grams of propylene carbonate. The product in this case has an ASTM nonvolatile content of 88.2 and a base number of 10.5. The product slowly crystallized on standing.

EXAMPLE 7

Preparation of a modified high solids coating

|  | Weight (grams) |
| --- | --- |
| Dispersion Phase | |
| [1]High Solids acrylic resin | 31.65 |
| Butyl Acetate | 14.04 |
| Titanium Dioxide | 100.00 |
| Reduction Phase | |
| [2]High Solids polyester resin | 30.23 |
| Hydroxy urethanes from examples #1-6 | 15.12 |
| [6]Cymel 303 | 31.68[5] |
| [3]Silica Gel | 6.07 |
| Butanol | 7.50 |
| Dinonyl Napthalene Sulfonic Acid | 0.35 |
| [4]Surfactant solution | 1.10 |
| Butyl Acetate | 14.90 |

[1] A high solids acrylic resin based on the reaction product of styrene, butyl acrylate and 2-hydroxyethyl acrylate.
[2] A high solids polyester resin based on the reaction product of Isophthalic acid, Neopentyl Glycol and Adipic acid.
[3] A dispersion of 7% of synthetic amorphous silica (Aerosil R974) available from DeGussa in high solids polyester.
[4] A 50% solution of a non-ionic surfactant (Dislon L1980) from King Industries in Butyl Cellosolve Acetate.
[5] The level of melamine crosslinker was varied for each paint in keeping with maintaining the stochiometric level.
[6] Cymel 303 is a melamine-formaldehyde condensation product from American Cyanamid Co.

(COMPARATIVE) EXAMPLE 8

Preparation of a Standard High Solids Paint

A standard high solids paint is made according to the following formula.

|  | Weight (grams) |
| --- | --- |
| Dispersion Phase | |
| High Solids acrylic resin | 31.65 |
| Butyl Acetate | 14.04 |
| Titanium Dioxide | 100.00 |
| Reduction Phase | |
| High Solids polyester resin | 45.89 |
| Cymel 303 | 34.00 |
| Silica Gel | 6.07 |
| Butanol | 7.50 |
| Dinonyl Napthalene Sulfonic Acid | 0.35 |
| Surfactant solution | 1.10 |
| Butyl Acetate | 10.85 |

The resulting paint made from this formula has a calculated weight solids content of 80%, a measured ASTM voc of 2.45, but a viscosity of 50 seconds as measured by a Zahn #2 cup at 80 F.

EXAMPLE 9

The paints made from the examples cited are shown in the following table.

| Diluent | Viscosity (Z2 @ 80F) | ASTM NV |
| --- | --- | --- |
| None (comparative Ex. 8) | 50 seconds | 79.1 |
| Example 1 | 37 seconds | 80.3 |
| Example 6 | 39 seconds | 80.1 |

This invention provides for the use of hydroxyl functional urethane reactive diluents for use in high solids coatings where the diluents impart the desirable property that low levels of volatile organic solvents are required to reduce the viscosity of the paint for application, and is illustrated by the foregoing description and examples, but is not intended to be limiting, except by the appended claims.

I claim:

1. A non-aqueous, high solids coating composition comprising on a polymeric solids weight basis:
   between 10% and 50% acrylic polymer having a number average molecular weight measured by GPC between 500 and 2500 and a hydroxyl number between 50 and 200;
   between 10% and 60% polyester polymer having a number average molecular weight measured by GPC between 250 and 2,000 and a hydroxyl number between 115 and 285;
   between 5% and 60% hydroxyl functional urethane diluent produced by reacting one equivalent of a primary or a secondary amine with between 0.8 and 1.5 equivalents cyclic carbonate to produce said diluent having a number average molecular weight as measured by GPC between 150 and 1000 and a hydroxyl number between 100 and 750; and
   between 20% and 40% of a coreactive amine derivative selected from an aminoplast resin or a glycoluril adapted to coreact with the acrylic polymer, the polyester polymer, and the hydroxyl functional urethane diluent.

2. The composition in claim 1 where the hydroxyl functional urethane diluent comprises a hydroxyl amine reacted with the cyclic carbonate.

3. The composition in claim 1 where the hydroxyl functional urethane diluent comprises a diamine reacted with the cyclic carbonate.

4. The composition in claim 1 where the cyclic carbonate is selected from ethylene carbonate or propylene carbonate.

5. The composition in claim 1 where the hydroxyl functional carbonate comprises two cyclic carbonate molecules reacted with a diamine molecule.

6. The composition in claim 1 where the polymeric solids comprise on a weight basis:
   between 15% and 25% acrylic polymer;
   between 20% and 50% polyester polymer;
   between 10% and 30% said diluent; and
   between 25% and 35% said amine derivative.

7. The composition in claim 1 where the composition contains pigment.

8. The composition in claim 7 where the pigment is ground into the acrylic polymer.

* * * * *